United States Patent [19]
Noda

[11] Patent Number: 5,746,797
[45] Date of Patent: May 5, 1998

[54] PROCESS FOR PRODUCING A GRADIENT INDEX OPTICAL ELEMENT

[75] Inventor: Satoshi Noda, Akishima, Japan

[73] Assignee: Olympus Optical Co., Ltd., Tokyo, Japan

[21] Appl. No.: 580,884

[22] Filed: Dec. 29, 1995

[30] Foreign Application Priority Data

Dec. 29, 1994 [JP] Japan ............... 6-340470

[51] Int. Cl.$^6$ ............... C03B 8/00; C03B 37/016; C03C 15/00; C03C 37/018
[52] U.S. Cl. ............... 65/17.2; 65/30.1; 65/30.13; 65/415; 65/440
[58] Field of Search ............... 65/17.2, 30.1, 65/30.13, 111, 395, 415, 440

[56] References Cited

U.S. PATENT DOCUMENTS

| | | |
|---|---|---|
| 3,859,103 | 1/1975 | Yoshiyagawa et al. |
| 4,203,744 | 5/1980 | Schultz et al. ............... 65/30.1 |
| 4,246,016 | 1/1981 | Siegmund ............... 65/30.13 |
| 4,302,231 | 11/1981 | Macedo et al. |
| 4,767,435 | 8/1988 | Omi et al. ............... 65/30.13 |
| 4,797,376 | 1/1989 | Caldwell et al. |
| 4,902,330 | 2/1990 | Sakai et al. ............... 65/30.13 |
| 5,069,700 | 12/1991 | Yamane et al. |
| 5,160,358 | 11/1992 | Kondo et al. ............... 65/17.2 |
| 5,182,236 | 1/1993 | Caldwell et al. ............... 65/17.2 |
| 5,236,486 | 8/1993 | Blankenbecler et al. ............... 65/30.1 |
| 5,244,844 | 9/1993 | Inami et al. ............... 65/30.13 |
| 5,439,495 | 8/1995 | Koike et al. ............... 65/17.2 |

*Primary Examiner*—Donald E. Czaja
*Assistant Examiner*—Jacqueline A. Ruller
*Attorney, Agent, or Firm*—Cushman Darby & Cushman IP Group of Pillsbury Madison & Sutro LLP

[57] ABSTRACT

A gradient index optical element is disclosed which comprises a surface perpendicular to an optical axis, this surface having points of equal refractive index whose connection provides substantially elliptic lines. This gradient index optical element can be produced, for example, by first pouring a raw material sol into a vessel suited for preparing a rodlike base material comprising a surface perpendicular to its lengthwise direction, said surface having the shape of a rectangle, a rhombus or a polygon symmetrical with respect to its center of gravity, each as is, or having a rounded or elliptical corner subsequently converting the sol to a gel, then subjecting the gel to distribution providing treatment and finally drying and firing the distribution providing gel. A gradient index optical element having, along its X- and Y-directions, refractive index distribution profiles different from each other can be produced at low cost, which permits one construct an optical system suitable for use in a technique of effecting image compression along a lateral direction and which attains a substantial miniaturization of a lens system, for example, a TV lens system.

9 Claims, 2 Drawing Sheets

PROCESS FOR PRODUCING A GRADIENT INDEX OPTICAL ELEMENT

BACKGROUND OF THE INVENTION

1. Field of the Invention

The present invention relates to a gradient index optical element and a process for producing the same. In preferred form, the present invention is concerned with a gradient index optical element having, along its X- and Y-directions, refractive index distribution profiles different from each other and a process for producing the same.

2. Discussion of Related Art

Each TV lens system (studio TV camera, cam coder, electronic still camera, etc.) generally conducts such a processing that it receives an image on a detector such as a laterally lengthy rectangular camera tube or solid state image pickup element (CCD, CMD, AMI, FIT, etc.) and converts the image to electrical signals. However, the optical system has rotational symmetry relative to its optical axis, so that each of the lenses is circular. Consequently, the image formed by the lens is also circular. Therefore, as one may see illustrated in FIG. 2, the image formed over the vertical portion of the detector has a useless hatched portion 2 around the detector 1. The partial uselessness of the image results in a constant formation of a useless image portion, that is, a useless occupation of space by the optical system. This is a factor that prevents the miniaturization of the TV lens system.

In particular, recently, the aspect ratio of the size of the TV image plane is being changed from 3:4 to 9:16 in accordance with the conversion to HDTV and employment of its pre-stage wide TV. That is, the configuration of the image plane is becoming more lengthy sideways. From the viewpoint of the TV lens system, this conversion lowers the ratio of the area of the detector to the size of a circularly formed image, thereby deteriorating the space utilization efficiency of the optical system with the result that the miniaturization of the TV lens system is rendered difficult. In the case of the HDTV, not only must the image forming capability per se be markedly improved, this alone necessitating an increase of the size of the optical system, but also the above aspect ratio change accompanies the same to thereby cause a tendency for a further increase of the size of the optical system. Thus, the miniaturization of the optical system is increasingly very difficult.

Thus, a method for optical system miniaturization has been proposed in which an optical system compresses an image in its lateral direction and causes a square or nearly square image derived from a laterally lengthy image by the compression to be received on a detector which is not laterally lengthy, where signal processing is conducted, and in which the image restores its laterally lengthy form at the stage of image reproduction. The image reproduction can be carried out by exactly the same signal processing as before with the use of a detector having its picture elements arranged in accordance with the compression of the image. The compression of the image is not necessarily limited to that resulting in a square form and, for example, the case is also considered in which the aspect ratio is changed from 9:16 to 3:4 to thereby cause the image of wide TV to be received on the conventional detector such as NTSC so that the conventional image pickup devices can be utilized.

The compression of an image along its lateral direction can be conducted by a method in which a cylindrical lens or an anamorphic lens is arranged in the optical system. The anamorphic lens is one comprising a surface perpendicular to an optical axis, this surface having therein two mutually crossing directions (X- and Y-directions) along which refractive indices are different from each other.

Certainly, an image can be unidirectionally compressed by arranging in an optical system a cylindrical lens or an anamorphic lens having refractive indices which are different from each other along X- and Y-directions. However, this involves the addition of a new lens to the conventional lens system for achieving the image compression, so that it is retrogressive from the viewpoint of the miniaturization of the entire lens system. Especially, the increase of the number of lenses is disadvantageous when the requirement for miniaturizing the lens system as extensively as possible is taken into account. The instance in which the miniaturization of the lens system as extensively as possible is required is, for example, one in which use is made of a video endscope having its front end equipped with a built-in TV camera. In such an instance, desired optical performance must be attained even with the use of a lens system in which the number of lenses has been reduced to as small as about 2 or 3 and in which the total lens length has also been rendered extremely small. With respect to the video endscope, the reduction of the outer diameter of the lens is required for improving the insertability thereof and the reduction of the length of the lens system is required for improving the bending performance thereof. Thus, the utmost miniaturization of the video endscope is required and this is a typical example in which the addition of a new cylindrical lens is very difficult.

SUMMARY OF THE INVENTION

The present invention has a first aspect, a second aspect and a third aspect.

The object of a first aspect of the present invention is to provide a gradient index optical element suitable for constructing a miniaturized lens system capable of unidirectionally compressing an image without the use of a cylindrical lens or an anamorphic lens.

The object of a second aspect of the present invention is to provide a process for producing a gradient index optical element suitable for constructing a miniaturized lens system capable of unidirectionally compressing an image without the use of a cylindrical lens or an anamorphic lens.

The object of a third aspect of the present invention is to resolve a task brought about in imparting an elliptic distribution to a gradient index optical element through the exploitation of a configuration difference between X- and Y-directions in connection with the second aspect of the present invention.

Illustratively, the above impartation of an elliptic distribution to be attained through the exploitation of a configuration difference between X- and Y-directions in the second aspect of the present invention causes the resultant glass configuration to have lengths different from each other between the X- and Y-directions. In an optical system, the entirety of the ellipse is not utilized and only a circular portion around the center of gravity of the rod is utilized, so that the periphery of the rod produced according to the second aspect of the present invention must be machined so as to shape the rod into a cylindrical form. That is, the object of the third aspect of the present invention is to avoid the cost increase attributed to the machining workload and material wasting.

Moreover, in the second aspect of the present invention, a base material having, for example, an elliptic configuration is immersed in a distribution providing fluid to thereby perform a concentration distributing treatment. Thus, the refractive index distribution of the elliptic rod having undergone the concentration distributing treatment is approximately elliptic similarly to the configuration of the base material. Consequently, a refractive index distribution having varied refractive index distribution gradients (Δn/mm) results although the peripheral portion of the rod has equal refractive index and the refractive index difference between the center and the peripheral portion is equal between X- and Y-directions. Therefore, cutting a circular rod out of the elliptic rod leads to removal by cutting of a peripheral portion along the direction of the major axis, so that without exception the value Δn along the direction having been the direction of the major axis becomes smaller than that along the direction having been the direction of the minor axis. In addition, changing the sign of the Δn is in principle unfeasible with respect to both along the X- and Y-directions, so that it is difficult to realize an extreme increase of the Δn difference between the X- and Y-directions with the result that the function of the cylindrical lens has been limited to some extent.

Accordingly, the object of the third aspect of the present invention is to provide a process for producing a gradient index optical element having the function of the cylindrical lens or anamorphic lens at lowered cost and also to provide a process for producing a gradient index optical element improved with respect to the above function.

The foregoing and other objects, features and advantages of the present invention will become apparent from the following detailed description and appended claims taken in connection with the accompanying drawings.

DETAILED DESCRIPTION OF THE INVENTION

Figure 1A:
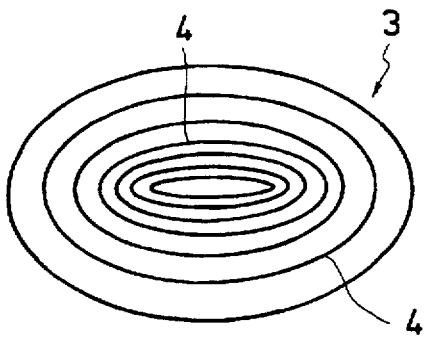
FIGS. 1A and 1B is a view illustrating the process according to the second aspect of the present invention and is a model view showing by means of contour lines the refractive index distribution in a surface perpendicular to an optical axis of each of gradient index optical elements having respectively undergone a refractive index distribution providing treatment and a mirror formation.

For overcoming the above-mentioned drawbacks of the prior art, according to the first aspect of the present invention, a gradient index optical element comprising a surface perpendicular to an optical axis is provided. This surface has points of equal refractive index whose connection provides substantially elliptic lines.

Further, according to the second aspect of the present invention, a process for producing the above gradient index optical elements is provided which comprises a step of imparting a composition distribution to a rodlike base material comprising a surface perpendicular to its lengthwise direction. This surface has the shape of a rectangle, a rhombus or, more generally, a polygon symmetrical with respect to its center of gravity each as it is or having a rounded or elliptical corner.

In particular, it is preferred that the rodlike base material be a gel being an intermediate product obtained in the sol-gel process for preparing a gradient index optical element. In a preferred mode of the process according to the second aspect of the present invention, first, a sol as a starting material is poured into a vessel suitably shaped so as to form a rodlike sol comprising a surface perpendicular to its lengthwise direction. This surface has the shape of a rectangle, a rhombus or, more generally a polygon symmetrical with respect to its center of gravity, each as is or having a rounded or elliptical corner. Subsequently, the rodlike sol is converted to a gel and subjected to a distribution providing treatment and drying/firing. The above vessel suitably shaped so as to form a rodlike sol comprising a surface perpendicular to its lengthwise direction, this surface having the shape of a rectangle, a rhombus or, more generally a polygon symmetrical with respect to its center of gravity, each as is, or having a rounded or elliptical corner is one having a cross section which has lengths different between X- and Y-directions.

Still further, according to the third aspect of the present invention, process for producing the above gradient index optical element, is provided which comprises a step of providing a base material along two directions perpendicular to its lengthwise direction, i.e., X- and Y-directions with concentration distributions under conditions different from each other.

The above provision of concentration distributions under conditions different from each other along X- and Y-directions can be accomplished, for example, by masking either of the X- and Y-directions of the base material. Alternatively, it can be accomplished by contacting the X- and Y-directions of the base material with different distribution-providing solutions or by contacting the X- and Y-directions of the base material with a distribution-providing solution of the same kind for different periods of time. In the process according to the third aspect of the present invention, although any of the various conventional diffusion-based processes for producing gradient index optical elements can be applied, it is preferred that the base material be a wet or dry gel produced according to the sol-gel process.

First, the function exerted according to the first aspect of the present invention will be described.

In a lens as a gradient index optical element having a radial refractive index distribution, its medium has refracting power, so that the refraction of light is brought about not only by the profile of the lens surface but also by the medium. Therefore, the refracting power of the whole of the lens is the sum of those of the lens surface profile and the medium as expressed by the following formula:

$$\phi = \phi_s \phi_m \tag{1}$$

wherein $\phi$, $\phi_s$ and $\phi_m$ represent the refracting power of the whole of the lens, the refracting power at the lens surface and the refracting power possessed by the medium respectively. Accordingly, even if the profile of the lens surface is identical, a lens of different refracting power can be obtained by a change of the refractive index distribution of the medium.

If the above is applied to two directions in a single lens, it means that, even if a lens has a planar or spherical surface in which the refracting power along the X-direction is equal to that along the Y-direction, the lens can be an optical element having refracting powers different between X- and Y-directions by providing the medium with refractive index distributions different between X- and Y-directions. From the viewpoint of refracting power, the above corresponds to the addition of a cylindrical lens to the ordinary lens.

A lens system in which a gradient index optical element is utilized for effective correction of chromatic aberration is very advantageous from the viewpoint of constructing a high-performance lens system with a small number of lenses. This is because the gradient index optical element per se can change the occurrence of chromatic aberration, so that correction of chromatic aberration can be effected by appropriately selecting medium characteristics even in a system composed of a small number of lenses. This is one of the reasons for especially bright prospect of the gradient index optical element in the use in future optical systems as radically different from aspherical lenses. Actually, wide applications of the gradient index optical element are being studied even to lens systems other than those of special specifications such as unidirectional image compression.

Consequently, it has been concluded that the gradient index optical element is most ideal and especially preferable as an optical element for use in overcoming the above drawbacks of the prior art to be solved by the present invention because the effect of a cylindrical lens can easily be added by regulating medium characteristics as mentioned above.

The refractive index distribution profile for actually differentiating refracting powers between X- and Y-directions will be considered below. Generally, the refractive index distribution profile of the gradient index optical element is expressed as the function of distance (r) from an optical axis according to the following refractive index distribution formula:

$$N = N_0 + N_1 r^2 + N_2 r^4 + N_3 r^6 + \quad (2).$$

The refraction of light is governed by $N_1$ of the above formula which is a coefficient known as the coefficient of second degree. Therefore, a distribution is preferred in which the $N_1$s along X- and Y-directions have the same sign and have different values. This, when considered in terms of lines connecting points of equal refractive index in a surface perpendicular to an optical axis, means that a substantially elliptic distribution is desired although a strict profile cannot be specified with respect to an ideal refractive index distribution because it depends on varied design.

Moreover, the application of the gradient index optical element of the present invention to an optical system is not limited to the use of a single optical element thereof and a plurality of optical elements thereof can be used. However, the smaller the number of gradient index optical elements, the greater the advantage from the viewpoint of assembly simplicity because the assembly of a lens system requires not only optical axis alignment but also X- and Y-axis regulations.

Now, the function of the second aspect of the present invention will be described.

Figure 1B:
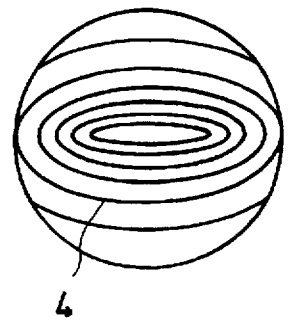
Figure 2:
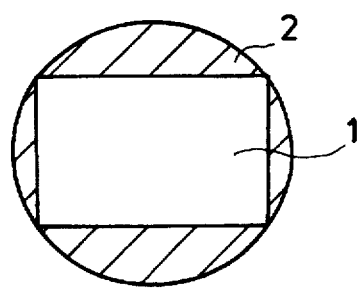
FIG. 2 is a model view showing a difference between a visual field of formed image and a detector shape with respect to the conventional TV optical system.

In reference to the process for producing a gradient index optical element jointly possessing the effect of a cylindrical lens, first, a rodlike base material having, for example, a rectangular section is prepared for rendering an elliptic line connecting points of equal refractive index in a surface perpendicular to an optical axis. This elliptic cylindrical base material is provided with a composition distribution with the result that a distribution directed from the periphery of the ellipse toward the center thereof is formed as shown in FIG. 1(a) and that a refractive index distribution having elliptic lines connecting points of equal refractive index 4 is formed in the base material 3. The distribution-provided elliptic cylinder may be incorporated in an optical system, as is. However, since this wastes space in the major axis periphery, the major axis periphery is generally cut so as to form a cylinder whose central axis is composed of intersections of each of the major axis and the minor axis of the ellipse as shown in FIG. 1(b) prior to incorporation into an optical system.

Practically, various processes are applicable depending on the type of base material selected. For example, a gradient index optical element having an elliptic distribution can be produced by providing a special optical glass of elliptic cylinder as a base material and subjecting it to ion exchange in a molten salt. Alternatively, the gradient index optical element having an elliptic distribution can be produced by providing an elliptic cylinder of porous glass as a base material and conducting stuffing/unstuffing of a suitable salt according to the molecular stuffing process. Furthermore, the gradient index optical element having an elliptic distribution can be produced by providing a gel as a base material synthesized from an alkoxide or other starting material and either conducting stuffing/unstuffing of a suitable salt therefor or leaching of only a special component followed by drying/firing.

In the ion exchange and molecular stuffing processes, it is requisite that the glass or porous glass for providing a base material be worked into an elliptic cylinder in advance. Since there is no established method for mass production of an elliptic cylinder at low cost, it cannot be helped to admit that the ion exchange and molecular stuffing processes requiring working of an elliptic cylinder have some unsolved problem in process efficiency. In contrast, the sol-gel process enables easy production of a gel having any desired shape in accordance with the shape of the vessel in which the sol is poured and converted to a gel. Therefore, although a vessel of elliptic cylinder must be prepared in advance, the sol-gel process is advantageous because the vessel for gel formation can be used as many times as desired, so that, even if not a little workload is consumed in the preparation of an elliptic cylinder, its effects on cost and accuracy are trivial. Further, the sol-gel process enables easy provision of composition distributions for a variety of components, so that it is most suitable to production of an optically superior gradient index optical element having low or negative dispersion distribution characteristics. As mentioned above, the sol-gel process is suitable to construction of a lens system having been minimized in both the number of lenses and the size. Therefore, the sol-gel process is especially preferred in the application of the present invention.

With respect to the shape of the vessel for gel formation, the required refractive index distribution profile varies depending on variable design and there is no ideal refractive index distribution profile, as mentioned above. Thus, an elliptic cylinder is not always solely desirable.

Figure 3A:
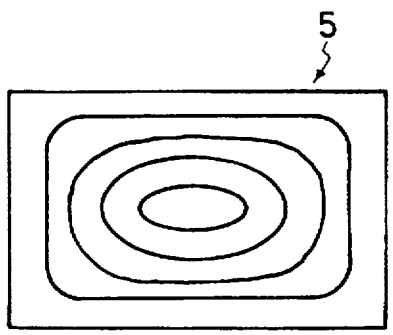
FIGS. 3A and 3B is a model view showing a refractive index distribution profile obtained when use is made of a base material having a rectangular section in accordance with an embodiment of the first aspect of the present invention.
Figure 3B:
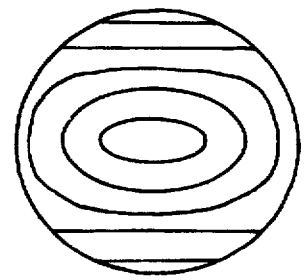

A vessel having lengths different between X- and Y-directions is satisfactory for differentiating refracting powers between X- and Y-directions. For example, a vessel having a rectangular cross section is satisfactory. When the gel having are rectangular section is subjected to a distribution providing treatment, the refractive index distribution profile of the gel 5 is not also rectangular but has the shape of a rectangle having its corners rounded as shown in FIG. 3(a). The ratio of the refracting power along X-direction to that along Y-direction can be changed by changing the lengths of the long and short sides of the rectangle as in the changes effected to the major and minor axes of the ellipse. In the production of the gel, when the gel has sharp-pointed corners, gel chipping would be likely to occur to thereby cause trouble in the process. Therefore, it is preferred that the gel corners be rounded to an extent that no problem would arise taking into account the formed refractive index distribution profile. Moreover, the sectional configuration of the vessel is not limited as long as the vessel has lengths different between X- and Y-directions. It is not limited to the shape of a rectangle and may have the shape of a rhombus. The configuration of the vessel is preferred to be symmetrical with respect to two directions mutually crossing at right angles for providing the properties of a cylindrical lens. However, generally, even if it is an appropriate polygon, nonsymmetrical refraction characteristics can be provided as long as the vessel configuration is symmetrical with respect to its center of gravity.

Thus, the gradient index optical element capable of realizing miniaturization of a lens system can be provided. Examples of TV lens systems to which the present invention can be applied include not only the above-mentioned studio TV camera, cam coder, electronic still camera and video endscope having its front end equipped with a built-in TV camera, but also a handy TV camera (portable), a monitoring camera, a door scope, a visual telephone, a TV conference system, a TV projector, a video microscope, an image input camera for computers (including the type built in the main frame of a personal computer), an image input camera for in-line measurement and other optical systems in which the input image is not directly output, but worked by, for example, image processing. In addition to those operated via TV and other electrical signals, the present invention can be applied to other optical devices if these can work images. For example, a system based on a fiber scope capable of transmitting images by means of an optical fiber would be feasible in which an image is unidirectionally compressed by means of an objective lens equipped with the gradient index optical element of the present invention, the compressed image is transmitted by means of an image guide and the image is restored in laterally lengthy form by means of an eyepiece.

The first and second aspects of the present invention are applicable to not only a convex lens capable of focusing light but also a concave lens capable of diverging light. Illustratively, the convex lens is provided with a dopant concentration distribution such that the dopant concentration is the maximum at the lens center so as to cause the refractive index to become higher at the lens center than at the lens periphery. The contrary applies to the concave lens.

The function of the third aspect of the present invention will be described below.

Figure 4:
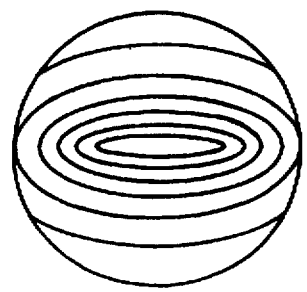
FIG. 4 is a model view showing by means of contour lines the refractive index distribution in a surface perpendicular to an optical axis of a gradient index optical element produced by the process according to the third aspect of the present invention.

When the base material is treated for distribution provision under conditions different between the X- and Y-directions of the base material, dopant replacement, leaching and infiltration occur in compliance with the rule of diffusion along each of the X- and Y-directions. Consequently, the sectional profile of formed refractive index distribution is shaped like a continuous fusion of the two-directional distributions, and an optically designed substantially elliptic profile can be realized by appropriately selecting conditions. A substantially elliptic refractive index distribution profile can be imparted inside a cylindrical base material, so that the resultant gradient index optical element as it is can be incorporated in an optical system without working the periphery thereof. Therefore, peripheral working can be avoided with the result that workload cost and material cost corresponding to the portion having conventionally been cut off can be saved. FIG. 4 is a model view showing by means of contour lines the refractive index distribution in a surface perpendicular to an optical axis of a gradient index optical element produced by the process according to the third aspect of the present invention.

Figure 5:
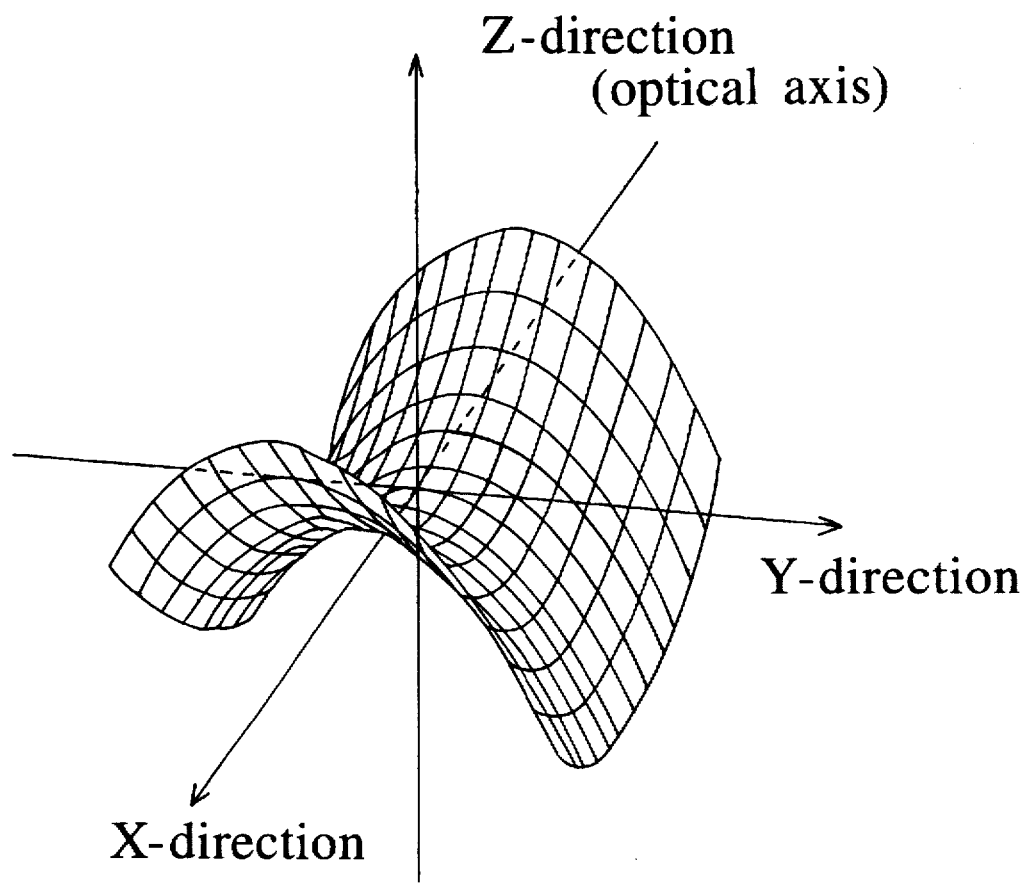
FIG. 5 is a graph showing a saddle-shaped refractive index distribution of a gradient index optical element according to the third aspect of the present invention.

In the process according to the third aspect of the present invention, when the distribution provision along the X- and Y-directions is carried out by contacting solutions containing components capable of changing refractive index with the base material, the internal refractive index distribution of the optical element can be controlled in various forms by selecting the type of the solution to be employed along each of the directions, for example, contacting a solution less contributory to refractive index with the X-direction of the base material while contacting a solution highly contributory to refractive index with the Y-direction of the base material. In particular, when a solution capable of increasing refractive index is contacted with the X-direction of the base material while a solution capable of decreasing refractive index is contacted with the Y-direction of the base material, a saddlelike refractive index distribution as shown in FIG. 5 can be provided in which the refractive index increases in accordance with the distance from the center (optical axis) along the X-direction and decreases in accordance with the distance from the center along the Y-direction. This distribution has a strikingly large value of refractive index difference $\Delta n$ inside the optical element as compared with the optical element in which the refractive index is changed in axially symmetrical fashion. The thus produced gradient index optical element has the function of a convex lens along the X-direction and has the function of a concave lens along the Y-direction. Further, the gradient index optical element exhibits a striking cylindrical lens action by a combination with the refraction at lens surface brought about by R working executed on the gradient index optical element, thereby exerting a substantial effect on conversion of image aspect ratio. For example, even if the medium has the function of a concave lens along the Y-direction, a large refracting power realized at the lens surface ground into convex form effectively causes the whole of the lens along both of the X- and Y-directions to have the function of a convex lens, namely, a cylindrical lens capable of focusing light.

Various processes are available for producing the above gradient index optical element, depending on the type of the base material selected. First, a gradient index optical element having refracting powers different between X- and Y-directions can be produced by providing a special optical glass as a base material and subjecting it to ion exchange in molten salts different between X- and Y-directions. Alternatively, the gradient index optical element can be produced by providing a porous glass as a base material and conducting stuffing/unstuffing of suitable salts with the use of solutions different between X- and Y-directions according to the molecular stuffing process. Furthermore, the gradient index optical element can be produced by providing as a base material a gel synthesized from an alkoxide or other starting material and either contacting the X- and Y-directions of the gel with different solutions to thereby conduct stuffing/unstuffing or leaching of only a special component followed by drying/firing.

In any of the ion exchange, molecular stuffing and sol-gel processes, the glass, porous glass or gel as a base material can be used in cylindrical form, as is, so that the conventional base material can be employed without any working for modification. However, taking into account the maximum reduction of the number of lenses and the most extreme miniaturization in a TV lens system or the like, not only is it required to possess properties ensuring a large Δn for enabling full exertion of the effect of the medium but also the gradient index optical element per se is satisfactorily free of chromatic aberration and is required to have properties capable of satisfactorily correcting the chromatic aberration of the entire lens system. Therefore, it is most desirable to employ the sol-gel process in which there is not much restraint on compositions permitting distribution provision and in which pretty complex distribution combination would be feasible.

Distribution-providing conditions which are different from each other can be effectively achieved by changing the method of contacting a base material with a distribution-providing fluid or by changing a distribution-providing fluid according to the part of contact. The former comprises masking a surface of the base material along a specified direction to thereby control the area of contact of the distribution-providing fluid and the base material. On the other hand, the latter can be realized either by changing the type of the distribution-providing solution brought into contact with each direction of the base material or by changing the concentration with the type unchanged. In particular, a lens having the function of a convex lens along the X-direction and having the function of a concave lens along the Y-direction can be prepared by changing the type of the distribution providing fluid.

Contacting individual directions of the base material with different distribution providing solutions can be realized by showering the individual directions of the base material with different distribution providing solutions or by separating the periphery of the base material by means of partitions resistant to distribution providing solutions followed by filling zones enclosed by the respective partitions with different distribution-providing solutions to thereby effect distribution provision.

Description has been made with respect to the distribution provision conducted under distribution-providing conditions which are different between X- and Y-directions as an embodiment of the present invention. However, the distribution provision is not limited to the simple differentiation of conditions between X- and Y-ldirections. It is satisfactory that the distribution provision be conducted under conditions differentiated among multiple directions with respect to the section of the base material provided that the conditions are different between X- and Y-directions when the entire base material is viewed. For example, the distribution provision may be conducted under conditions differentiated among 6 or 8 directions around the base material. Which directions have condition changes or what condition changes are effected along each direction is to be selected depending on the desired distribution profile.

Therefore, setting of conditions enabling symmetry with respect to an optical axis is not necessarily required. In the extreme, even when a refractive index distribution nonsymmetrical with respect to an optical axis is required, the third aspect of the present invention is applicable by appropriately setting the distribution-providing conditions for each direction in conformity with the refractive index distribution.

Thus, although simply there is no restraint on the distribution-providing conditions, practically it is difficult to carry out the distribution provision along too many directions. About eight directions are the upper limit. Consequently, in the complex manipulation of distribution profile, such a method would be desirable that the distribution provision is performed serially without completing it once by changing the mask and distribution providing fluid to thereby accomplish the desired distribution.

Moreover, the same can be realized by differentiating the distribution providing periods between X- and Y-directions. Practically, such a procedure would be desirable that first the surface of the base material is masked along one direction, secondly a distribution provision is conducted for a given period of time, thirdly the mask is removed and finally a further distribution provision is carried out. Such another procedure would also be desirable that the base material is contacted while being rotated about an optical axis with a distribution-providing fluid according to the technique in which the distribution-providing fluid is injected in showery form from around the base material to thereby contact the distribution-providing fluid with the base material, the above rotation being effected with intentional rotation irregularity so as to differentiate the period of contact with the showered fluid according to the locality of the base material. This differentiation of the period of contact with the fluid according to the locality of the base material causes the leaching, replacement and amount of infiltrated ions to also change according to the locality of the base material with the result that the concentration distribution profile can be differentiated between X- and Y-directions. This procedure has the advantage that the rotation of the base material suppresses the fluctuation of distribution.

Various means for achieving the objects of the present invention have been described. These means can be employed not only independently but also in combination to thereby enable more effective production of the desired gradient index optical element.

The gradient index optical element provided with substantially elliptic distribution which is useful in, for example, miniaturization of a TV lens system can be produced by virtue of the foregoing processes. A typical example to which the present invention can be applied is a TV lens system. Examples of TV lens systems to which the present invention can be applied widely include not only the above-mentioned studio TV camera, cam coder, electronic still camera and video endscope having its front end equipped with a built-in TV camera but also a handy TV camera (portable), a monitoring camera, a door scope, a visual telephone, a TV conference system, a TV projector, a video microscope, an image input camera for computers (including the type built in the main frame of a personal computer), an image input camera for in-line measurement and other optical systems in which input image is not directly output but worked by, for example, image processing.

As now apparent from the foregoing, the first aspect of the present invention enables construction of an optical system suitable for use in the lateral compression of images and also enables substantial miniaturization of a TV lens system or the like.

The second aspect of the present invention enables easy production of the above gradient index optical element for use in optical systems.

The third aspect of the present invention enables production at lowered cost of the gradient index optical element having refractive index distribution profiles different between X- and Y-directions. Further, the gradient index optical element exhibiting a large Δn difference between X- and Y-directions can be realized according to the second aspect of the present invention.

As mentioned above, the process for producing a gradient index optical element according to the second aspect of the present invention may be, for example, one in which, first, a sol as a starting material is poured into a vessel suitably shaped so as to form a rodlike sol comprising a surface perpendicular to its lengthwise direction, this surface having the shape of a rectangle, a rhombus or, more generally a polygon symmetrical with respect to its center of gravity each, as is or having its corner rounded or elliptical and in which subsequently the rodlike sol is converted to a gel and subjected to a distribution providing treatment and drying/firing.

Moreover, in the process for producing a gradient index optical element according to the third aspect of the present invention, the above provision of concentration distributions under conditions different between X- and Y-directions may be accomplished by masking either of the X- and Y-directions of the base material. Alternatively, the above provision of concentration distributions may be accomplished by contacting the X- and Y-directions of the base material with different distribution-providing solutions or by contacting the X- and Y-directions of the base material with a distribution-providing solution of the same kind for different periods of time. It is preferred that the base material, to be provided with refractive index distribution, be a wet or dry gel produced according to the sol-gel process.

PREFERRED EMBODIMENT OF THE INVENTION

The present invention will now be described in greater detail with reference to the following Examples, which should not be construed as limiting the scope of the invention.

EXAMPLE 1

A raw material batch was prepared comprising $SiO_2$, $ZrO_2$, $TiO_2$, $Al_2O_3$, $Li_2O$ and $MgO$ in respective concentrations of 55, 8, 5, 10, 12 and 10 mol % in terms of oxide, and $Sb_2O_3$ was added thereto in an amount of 0.5% by weight based on the total weight of the batch. The resultant batch was melted in a platinum crucible at 1400° C. and molded into a glass rod.

This glass rod was ground so as to have a section shaped like an ellipse of 5 mm in major diameter and 3 mm in minor diameter. The thus worked elliptic rod was immersed in a molten salt of $KNO_3$ heated at 530° C. for 180 hr to thereby effect an ion exchange. Measurement of the refractive index distribution of a section of the rod having undergone the ion exchange showed that the refractive index distribution was in the form of ellipses, each substantially similar to the peripheral morphology of the rod, and it was confirmed that a gradient index optical element having focal lengths different between X- and Y-directions resulted. The outer periphery of the rod was again ground so as to shape the rod into a cylindrical form having its center agreeing with the center of gravity of the section profile, thereby enabling use in an optical system as a cylindrical lens.

EXAMPLE 2

25 ml of 0.01N hydrochloric acid was added to 50 ml of tetramethyl silicate and agitated for 1 hr to thereby effect a partial hydrolysis reaction. A mixture of 98 ml of a 1.5 mol/l aqueous barium acetate solution and 40 ml of acetic acid was added thereto. The mixture was further agitated for about 3 min and poured into a perforated Teflon vessel shaped like an elliptic cylinder of 20 mm in major diameter and 10 mm in minor diameter. The vessel was closed with a lid and the mixture was converted to a gel at room temperature. The gel obtained was aged for 5 days and immersed in a solution of 0.45 mol/l barium acetate dissolved in a 6:4 in volume ratio mixed solvent of IPA and water at 60° C. to thereby achieve removal of acetic acid and aging of the gel. This gel was successively immersed in a 7:3 mixture of methanol and ethanol, ethanol, a 5:5 mixture of ethanol and acetone and acetone to thereby achieve precipitation of barium acetate microcrystals and fixing thereof in pores of the gel.

The resultant homogeneous gel was immersed in 150 ml of a solution adjusted so as to be a solution of 0.3 mol/l potassium acetate dissolved in methanol and also to be a solution of 0.15 mol/l acetic acid dissolved in methanol for 35 hr to thereby effect a distribution provision. Thereafter, the gel was successively immersed in a 5:5 mixture of ethanol and acetone, acetone and acetone to thereby achieve precipitation of microcrystals of barium and potassium acetates and fixing thereof in pores of the gel.

The resultant gel was dried in dry air at 30° C. for 10 days to thereby obtain a dry gel. The dry gel obtained was fired in a tube furnace by raising the temperature to 750° C. while causing oxygen and helium to flow therethrough, thereby obtaining a crackfree fired rod shaped like an elliptic cylinder of about 8.5 mm in major diameter and about 4.5 mm in minor diameter. Measurement of the refractive index distribution of a section of the thus fired rod showed that the refractive index distribution was in the form of ellipses each substantially similar to the peripheral morphology of the rod, and it was confirmed that a gradient index optical element having focal lengths different between X- and Y-directions resulted.

EXAMPLE 3

200 ml of silicon tetraethoxide, 90 ml of ethanol and 16 ml of 2N hydrochloric acid were mixed together to thereby effect a partial hydrolysis of the silicon tetraethoxide. Subsequently, a solution obtained by dissolving 72 g of a solution of 85% by weight zirconium n-butoxide dissolved in n-butanol in 138 ml of ethanol was added thereto and agitated for 1 hr. Thereafter, a solution of a mixture of water, ethanol, dimethylformamide and 1N aqueous ammonia was dropped thereinto on a water bath to thereby prepare a sol.

The obtained sol was poured into a polypropylene vessel of 5 mm×10 mm×200 mm in inner dimension finished so as to have R 0.5 edges. The two ends of the vessel were sealed, and the sealed vessel was allowed to stand still at room temperature overnight, thereby obtaining a wet gel. The wet gel was aged in a thermostat set at 60° C. for 4 days, and the aged wet gel was immersed in 3N sulfuric acid for 1 hr and 40 min to thereby leach the zirconium component. Thereafter, the wet gel was immersed in ethanol overnight and then immersed in a previously prepared 1:2 in volume ratio mixed alcohol of methanol and ethanol overnight to thereby remove the sulfuric acid component from the wet gel. The thus washed wet gel was put in a polypropylene test tube of 16.5 mm in inner diameter and closed with an aluminum foil. The test tube was placed in a thermostat set at 60° C. to dry the gel, thereby obtaining a transparent crackfree dry gel in which the zirconium component had a concentration distribution.

Subsequently, the dry gel was placed in a tube furnace and fired by raising the temperature to a maximum of 1150° C.

prior to which temperature retentions were effected at 350°, 400° and 1020° C. Thus, a firing product shaped like a square pole as if chamfered and having a size of 1.4 mm×2.7 mm×50 mm was obtained. Measurement of the refractive index distribution of a section of the fired rod showed that the refractive index distribution was substantially rectangular in the vicinity of the outer surface but substantially elliptic in the internal part, and it was confirmed that a gradient index optical element having focal lengths different between X- and Y-directions resulted.

The outer periphery of the fired product was ground so as to shape it into a cylindrical form having its center agreeing with the center of gravity of the fired product, thereby enabling use as a lens.

EXAMPLE 4

30 ml of tetramethyl silicate and 7.2 ml of triethyl borate were mixed together, and 15 ml of 0.01N hydrochloric acid was added thereto and agitated at room temperature for 1 hr to thereby effect a partial hydrolysis reaction. A mixture of 80.7 ml of a 2 mol/l aqueous potassium acetate solution and 36.8 ml of 1.2 mol % acetic acid was added thereto. The mixture was further vigorously agitated at room temperature for 3 min, allowed to stand still for 3 min and poured into a perforated Teflon vessel shaped like an elliptic cylinder. The mixture was converted to a gel at room temperature. The gel obtained was aged at 30° C. for 5 days and immersed in an ethanol solution of lead and potassium acetates to thereby complete the gel aging. The resultant gel was successively immersed in a 5:5 mixed solvent of IPA and water and acetone each for two days to thereby achieve precipitation of microcrystals of lead and potassium acetates and fixing thereof in pores of the gel.

The resultant homogeneous gel was immersed in a solution of 0.2 mol/l lead acetate dissolved in methanol for 6 hr to thereby effect a distribution provision. Thereafter, the gel was successively immersed in a 5:5 mixture of IPA and acetone, acetone and acetone each for 2 days to thereby achieve fixing of microcrystals of lead and potassium acetates. The resultant gel was dried at 30° C. for 5 days and fired by raising the temperature to 610° C. As a result, a colorless transparent gradient index optical element shaped like an elliptic cylinder, having focal lengths different between X- and Y-directions and having the function of a convex lens was obtained.

EXAMPLE 5

A raw material batch was prepared comprising $SiO_2$, $ZrO_2$, $TiO_2$, $Al_2O_3$, $Li_2O$ and $MgO$ in respective concentrations of 55, 8, 5, 10, 12 and 10 mol % in terms of oxide, and $Sb_2O_3$ was added thereto in an amount of 0.5% by weight based on the total weight of the batch. The resultant batch was melted in a platinum crucible at 1400° C. and molded into a glass rod having a cylindrical form of 5 mm in diameter. Titanium oxide coatings of 2 in width facing each other in two directions were applied onto the peripheral surface of the rod, and the resultant rod was immersed in a molten salt of $KNO_3$ for 20 days to thereby effect an ion exchange. Measurement of the refractive index distribution of a section of the rod having undergone the ion exchange showed that the refractive index distribution was substantially elliptic, and it was confirmed that a gradient index optical element having focal lengths different between X- and Y-directions resulted.

EXAMPLE 6

25 ml of 0.01N hydrochloric acid was added to 50 ml of tetramethyl silicate and agitated for 1 hr to thereby effect a partial hydrolysis reaction. A mixture of 98 ml of a 1.5 mol/l aqueous barium acetate solution and 40 ml of acetic acid was added thereto. The mixture was further agitated for about 3 min and poured into a Teflon vessel of 20 mm in diameter. The vessel was closed with a lid and the mixture was converted to a gel at room temperature. The obtained gel was aged at 40° C. for 5 days and immersed in a solution of 0.45 mol/l barium acetate dissolved in a 6:4 mixed solvent of IPA and water at 60° C. to thereby achieve removal of acetic acid and aging of the gel. This gel was successively immersed in a 7:3 mixture of methanol and ethanol, ethanol, a 5:5 mixture of ethanol and acetone and acetone to thereby achieve precipitation of barium acetate microcrystals and fixing thereof in pores of the gel.

Partitions each made of a polypropylene plate were pressed so as to adhere to the side of the resultant homogeneous gel in a manner such that the periphery of the gel was divided into four parts. The interpartition spaces were alternately filled with a solution of 0.3 mol/l potassium acetate dissolved in methanol and a solution of 0.1 mol/l potassium acetate dissolved in methanol, and the immersion of the gel was conducted for 40 hr to thereby effect a distribution provision. Thereafter, the gel was immersed in acetone to thereby achieve precipitation of microcrystals of barium and potassium acetates and fixing thereof in pores of the gel. The resultant gel was satisfactorily dried in a drying oven to thereby obtain a dry gel. The obtained dry gel was fired in a tube furnace while causing oxygen and helium to flow therethrough, thereby obtaining a fired rod of about 7 mm in diameter. Measurement of the refractive index distribution of a section of the thus fired rod showed that the refractive index distribution was elliptic, and it was confirmed that a gradient index optical element having focal lengths different between X- and Y-directions resulted.

EXAMPLE 7

200 ml of silicon tetraethoxide, 90 ml of ethanol and 16 ml of 2N hydrochloric acid were mixed together to thereby effect a partial hydrolysis of the silicon tetraethoxide. Subsequently, a solution obtained by dissolving 72 g of a solution of 85% by weight zirconium n-butoxide dissolved in n-butanol in 138 ml of ethanol was added thereto and agitated for 1 hr. Thereafter, a solution of a mixture of water, ethanol, dimethylformamide and 1N aqueous ammonia was dropped thereinto on a water bath to thereby prepare a sol. The obtained sol was poured into a polypropylene vessel of 18 mm in diameter. The vessel was sealed and allowed to stand still at room temperature overnight, thereby obtaining a wet gel. The wet gel was aged in a thermostat set at 60° C. for 4 days.

The aged wet gel was showered with sulfuric acid solutions from eight directions around for 2 hr to thereby leach the zirconium component. During the shower, the gel was caused to have such a motion that the gel was unceasingly moved in the vertical direction while it was sometimes rotated by about 10 to 20 degrees and returned to the original state. The sulfuric acid concentration was 6N in a pair of opposite showering directions, 1N in a pair of opposite showering directions perpendicular thereto and 3N in slant showering directions intermediate therebetween. After the 2-hr showering, the wet gel was immersed in ethanol overnight and then immersed in a 1:2 mixed alcohol of methanol and ethanol overnight to thereby remove the sulfuric acid component from the wet gel. This operation was repeated twice to thereby remove the sulfuric acid to a satisfactory degree, and the thus washed wet gel was dried in a thermostat set at 60° C., thereby obtaining a transparent crackfree dry gel in which the zirconium component had a concentration distribution.

Subsequently, the dry gel was placed in a tube furnace and fired by raising the temperature to a maximum of 1150° C. prior to which temperature retentions were effected at 350°, 400° and 1020° C. Thus, a firing product of about 5.5 mm in diameter was obtained. Measurement of the refractive index distribution of a section of the fired rod showed that the refractive index distribution was substantially elliptic, and it was confirmed that a gradient index optical element having focal lengths different between X- and Y-directions resulted.

EXAMPLE 8

30 ml of tetramethyl silicate and 30 ml of tetraethyl silicate were mixed together, and 25 ml of 0.01N hydrochloric acid was added thereto and agitated for 1 hr to thereby effect a partial hydrolysis reaction. A mixture of 90 ml of a 1.25 mol/l aqueous lead acetate solution, 35 ml of a 1 mol/l potassium acetate solution and 14 ml of acetic acid was added, and the mixture was further vigorously agitated for 3 min and poured into a Teflon vessel of 20 mm in diameter. The vessel was closed with a lid and the mixture was converted to a gel at room temperature. The obtained gel was aged for 3 days and immersed in a solution of 0.6 mol/l lead acetate and 0.2 mol/l potassium acetate dissolved in a 8:2 mixed solvent of IPA and water at 60° C. to thereby achieve removal of acetic acid and aging of the gel. This gel was successively immersed in IPA, a 8:2 mixture of IPA and acetone, a 5:5 mixture of IPA and acetone and acetone and acetone each for 24 hr to thereby precipitate microcrystals of lead and potassium acetates in pores of the gel.

Partitions each made of a polypropylene plate of 0.5 mm in thickness were pressed so as to adhere to the side of the resultant gel in a manner such that the periphery of the gel was divided into four parts. The inter-partition spaces were alternately filled with an ethanol solution of 0.6 mol/l potassium acetate to which acetic acid had been added and an ethanol solution of 0.25 mol/l lead acetate to which acetic acid had been added, and a distribution provision treatment was conducted for 2 hr and 45 min. After the completion of the distribution provision treatment, the gel was successively immersed in a 5:5 mixture of IPA and acetone, acetone and acetone each for 24 hr to thereby achieve precipitation of microcrystals of lead and potassium acetates and fixing thereof in pores of the gel.

The resultant gel was satisfactorily dried in a drying oven at 30° C. while causing dry air to flow therethrough to thereby obtain a dry gel. The dry gel obtained was transferred into a tube furnace and fired therein by raising the temperature up to 570° C. while causing oxygen and helium to flow therethrough, thereby obtaining a colorless transparent glass body of about 7 mm in diameter. This glass body was sectionally split. Measurement of the radial refractive index distribution of the section showed the preparation of a gradient index optical element in which the refractive index distribution protrudent and recessed in directions crossing each other at right angles, respectively.

EXAMPLE 9

15 ml of 0.01N hydrochloric acid was added to 30 ml of tetramethyl silicate and agitated at room temperature for 1 hr to thereby effect a partial hydrolysis reaction. A mixture of 80.7 ml of a 2 mol/l aqueous potassium acetate solution and 36.8 ml of 1.2 mol % acetic acid was added thereto. The mixture was further vigorously agitated at room temperature for 3 min, allowed to stand still for 3 min and poured into a Teflon tube of 12 mm in diameter. The two ends of the tube were sealed, and the mixture was converted to a gel at room temperature. The obtained gel was aged at 30° C. for 5 days and immersed in an ethanol solution of lead and potassium acetates to thereby complete the gel aging. The aged gel was successively immersed in a 5:5 mixed solvent of IPA and water and acetone each for 24 hr to thereby precipitate microcrystals of lead and potassium acetates in pores of the gel. The resultant gel was immersed in a methanol solution of 0.2 mol/l lead acetate for 1 hr and 30 min to thereby effect a distribution provision. This gel was successively immersed in a 5:5 mixture of IPA and acetone, acetone and acetone each for 24 hr to thereby achieve fixing of the microcrystals of lead and potassium acetates. The gel was dried at 30° C., thereby obtaining a dry gel of about 7 mm in diameter.

A pair of Teflon sheets of 3 mm in width were vertically pressed so as to adhere to the peripheral surface of the obtained dry gel in a manner such that they faced each other. While keeping the sheets pressed to the peripheral surface of the gel so as to avoid peeling, the gel was immersed in an ethanol solution of 0.1 mol/l potassium acetate for 2 hr to thereby leach lead provided with a recessed concentration distribution in the stage of wet gel for replacement with potassium. The resultant gel was again successively immersed in a 5:5 mixture of IPA and acetone, acetone and acetone each for 24 hr and dried, thereby obtaining a dry gel. Finally, the gel was fired in a tube furnace by raising the temperature up to about 600° C., thereby obtaining a colorless transparent glass body of about 5.5 mm in diameter.

This glass body was sectionally split in its radial direction. Measurement of the radial refractive index distribution of the section showed the preparation of a gradient index optical element having a substantially elliptic refractive index distribution and having focal lengths different between X- and Y-directions.

EXAMPLE 10

Silicon tetramethoxide, ethanol and 1N hydrochloric acid were mixed together to thereby effect a partial hydrolysis of the silicon tetramethoxide. Subsequently, a solution obtained by dissolving titanium isopropoxide in ethanol in dry atmosphere was added and agitated for 1 hr. Thereafter, a solution composed of a mixture of ethanol and aqueous ammonia was put in the above solution and further agitated for 1 hr, thereby preparing a sol. The obtained sol was poured into a polypropylene test tube of 20 mm in diameter, and the tube was closed with a stopper. The sol was converted to a gel at room temperature. The resultant gel was aged in a thermostat at 60° C. for 2 days with the result that the gel shrank to about 17 mm in diameter.

A pair of Teflon sheets of 6 mm in width were vertically pressed so as to adhere to the peripheral surface of the aged gel in a manner such that they faced each other. While keeping the sheets pressed to the peripheral surface of the gel so as to avoid peeling, the gel was immersed in 2N hydrochloric acid. At the passage of 2 hr from the immersion, the Teflon sheets were immediately peeled from the gel in the hydrochloric acid and the immersion of the gel was continued for 3 hr.

The gel was immersed in ethanol overnight. This was repeated to thereby remove the hydrochloric acid from the gel and to completely terminate the distribution provision. Water was removed from the gel, and the gel was finally dried and fired. Thus, a gradient index optical element having focal lengths different between X- and Y-directions was obtained.

What is claimed is:

1. A process for producing a gradient index optical element comprising a step of providing a component capable of creating a refractive index distribution inside a rodlike base material with a concentration distribution inside the rodlike base material, wherein:

said rodlike base material has a lengthwise direction, a direction perpendicular to said lengthwise direction, and a section along said direction perpendicular to said lengthwise direction having a shape that is a polygon symmetrical with respect to its center of gravity, said polygon symmetrical with respect to its center of gravity having a sharp, rounded or elliptical corner, said step of providing a component capable of creating a refractive index distribution is effected by subjecting all sides of the rodlike base material to a replacement, a leaching or an infiltration of the component to be provided with the concentration distribution, and a noncircular concentric concentration distribution is formed inside the rodlike base material.

2. A process for producing a gradient index optical element comprising the step of providing a component capable of creating a refractive index distribution inside a rodlike base material with a concentration distribution inside the rodlike base material, wherein:

said step of providing a component capable of creating a refractive index distribution is effected by subjecting a side of the rodlike base material to a replacement, a leaching or an infiltration of the component to be provided with the concentration distribution, said step of providing a component being conducted under conditions different from each other between a plurality of zones of a peripheral surface of the rodlike base material.

3. The process according to claim 1, wherein said rodlike base material is a rodlike gel prepared from a sol.

4. The process according to claim 1, wherein said polygon symmetrical with respect to its center of gravity is a rectangle or a rhombus.

5. The process according to claim 2, wherein said rodlike base material is a rodlike gel prepared from a sol.

6. The process according to claim 5, wherein the peripheral surface of the gel is divided into a plurality of zones and the plurality of zones are contacted with concentration distribution imparting solutions which are different from each other so that the provision of the concentration distribution is conducted under conditions different from each other.

7. The process according to claim 5, wherein a mask is applied to part of the peripheral surface of the gel and the gel is immersed in a concentration distribution imparting solution so that the provision of the concentration distribution is effected under conditions different from each other between the zone having the mask applied thereto and a mask-free zone.

8. The process according to claim 6, wherein said rodlike gel has a substantially circular section in a direction perpendicular to its lengthwise direction.

9. The process according to claim 7, wherein said rodlike gel has a substantially circular section in a direction perpendicular to its lengthwise direction.

* * * * *